United States Patent Office 3,795,539

Patented Mar. 5, 1974

3,795,539

WATER-BASED BINDER FOR MAGNETIC TAPE

Alfonso DiMino, Woodcliff Lake, N.J., assignor to ADM Tronics, New York, N.Y.

No Drawing. Filed June 23, 1971, Ser. No. 156,030
Int. Cl. H01f *1/26, 1/113*
U.S. Cl. 117—235 2 Claims

ABSTRACT OF THE DISCLOSURE

A magnetic recording tape in which magnetic material, such as iron oxide particles, is mixed with a binder to create a dispersion which is coated on a base. The dispersion includes a water-based binder and wetting agent, whereby the dispersion may be applied and dried without creating noxious fumes, to produce a coating which is highly flexible and smooth and has lubricating properties.

BACKGROUND OF THE INVENTION

This invention relates to magnetic recording tapes and the like, and more particularly to an improved binder for such tapes.

Because of its high information storage density as well as its erase and immediate play-back characteristics, magnetic tape is widely used as a medium for sound and video recordings, for computers, telemetry, machine tool control and many other purposes.

A magnetic tape is composed of three constituents:

(1) the magnetic material,
(2) the binder which when mixed with the magnetic material creates a magnetic dispersion, and
(3) the base material on which the dispersion is coated.

The magnetic material currently employed is almost invariably acicular iron oxide particles about one micron in length, although limited use has been made of other ferromagnetic materials. The present invention is not restricted to any particular type of magnetic particles and any type acceptable for recording purposes may be used.

The base material of most tapes is cellulose acetate, polyethylene, terephthalate (Mylar) or unplasticized polyvinyl chloride. However, the invention is not limited to any one base material and is applicable to paper, metal or any other suitable magnetic recording substrate.

The formula for the dispersion depends largely upon the material used for the base, but since currently manufactured commercial tapes have plastic bases, we shall consider the existing forms of dispersions suitable therefor.

The dispersion for the magnetic particles is constituted by (A) the binder proper, (B) a plasticizer, (C) a wetting agent, (D) a resin, (E) two or more chemical solvents, (F) a lubricant and (G) an anti-bloom agent. We shall now consider each of these constituents.

The purpose of the binder is to hold the magnetic particles together when the dispersion has been applied to the base and the solvents have dried off. Nitrocellulose has heretofore been used extensively as a binder, for it possesses easy dispersion properties and the ability to produce a smooth surface. However, it has a tendency toward stickiness even when recognized lubricants are included. There is a growing tendency therefore to substitute one of the Bakelite compounds for nitrocellulose, such as vinylite. This material is free of stickiness but is not as smooth as nitrocellulose.

The purpose of the plasticizer is to impart flexibility to the binder. Since all fine powders tend to agglomerate, it is essential for the achievement of the correct coercivity and low noise level as well as uniformity in the finished tape, that agglomerates be broken up and evenly distributed in the final dispersion.

In order to prevent agglomeration, it is the usual practice to subject the constituents of the dispersion to several hours of ball milling. There is, however, a practical limit to the permissible ball-milling time, for after a period that may range from 24 to 76 hours, deterioration appears to set in. Such deterioration may assume the form of emulsification of the dispersion or a reduction in remanence as a result of the smashing of individual magnetic particles.

It is, therefore, desirable to include a wetting agent in the dispersion to reduce surface tension and thereby facilitate penetration of the binder constituents between particles in the early stages of ball-milling. Accordingly, the commercial practice has been to introduce one of the recognized vegetable wetting agents, together with the solvent as the first stage in the preparation of the dispersion, the mixture being then allowed to slurry for some hours before starting to mill or before adding other components to the dispersion.

The function of the resin in the dispersion is to toughen the dried coating. The amount involved is fairly critical, for if the quantity is too small, the coating will be brittle and tend to flake. But if the amount of resin is excessive, the finished tape will be sticky and subject to blocking effects, that is, the tendency of overlapping convolutions of the tape to adhere to each other and prevent unwinding.

In standard tape manufacturing techniques, two or more chemical solvents are invariably included in the dispersion since they are required to perform distinct functions; first to provide a thinner for the dispersion, and second to attack or etch the base to create a gripping surface for effective adhesion. Acetone is favored as an etching solvent when a cellulose acetate base is used, and toluol and butyl alcohol provide suitable thinners. One must exercise care to ensure a balance between the etching and thinning solvents, for an excess of the latter can inhibit the action of the former and result in inadequate anchorage of the coating to the base.

Binders such as nitrocellulose have sticky propensities and it is therefore the common practice to include small quantities of a suitable lubricant such as a silicone. It is also found that after a few hours of drying, the coating on the tape may develop a bloom which later transfers itself as a powder to the associated head in the course of recording or playback. This is highly undesirable, for the resultant build-up of powder on the face of the head causes a drop in head response. For this reason, the practice is to include an anti-bloom agent in the dispersion.

Since the conventional tape manufacturing techniques make use of chemical solvents in the dispersion, one is faced with the problem of toxic fumes that may endanger working personnel. While it is the practice to exhaust such fumes into the atmosphere, this gives rise to environmental pollution which is, of course, objectionable. Also with such solvents, there is the ever-present danger of explosion and fires.

SUMMARY OF THE INVENTION

In view of the foregoing, it is the primary object of this invention to provide a dispersion for a magnetic recording tape, which dispersion is a water-based solution having magnetic particles suspended therein, the dispersion being capable of forming a consistent and uniform coating firmly bonded to the substrate.

The magnetic particle dispersion in accordance with the invention may be used with any known form of film, such as polyesters, cellulosic material, nylon, polypropylenes, acetates, fluorocarbons, etc., as well as with papers and metallic sheets or other substrates.

Also an object of the invention is to provide a water-based dispersion for a magnetic recording medium which is completely inert and has no appreciable odor, thereby obviating the hazards and ecological drawbacks occasioned by chemical solvents.

Yet another object of the invention is to provide a dispersion of the above type which is easily mixed with the magnetic particles and wherein the particles have a lesser tendency to agglomerate, as compared to conventional dispersions. Hence though conventional mixing methods are employed, mixing time is substantially reduced.

Thus with the invention, it becomes possible in about ten hours of ball-mixing, to produce a satisfactory dispersion as against the usual forty hours required for this purpose. Since, as pointed out previously, the longer ball-mixing takes place, the greater the deterioration of the dispersion, the shorter mixing period apart from the substantial economies effected in production time, produces a superior product.

Another significant advantage of the invention is that the base web, when coated with the water-based dispersion is free of a tendency to offset or bloom.

The sensitivity of a given tape depends on the quantity of magnetic oxide present per unit length. Thus it is clearly desirable to make the quantity as high as is feasible. The best oxide-to-binder ratio in conventional tape generally lies between 60 to 75 percent, for any attempt to go beyond this percentage usually results in an excess of oxide which the dispersion will not hold and which either sheds or gives rise to a rough coating surface.

A rough surface will, as pointed out previously, have an abrasive effect on the recording and erase heads. But with the present invention, different amounts of iron oxide can be introduced, depending on the type of tape desired, and at any time before the coating is applied, the dispersion may be thinned with water, without jeopardizing the end result.

In order to impart desired characteristics to magnetic tape, such as smoothness and non-abrasiveness, some manufacturers overcoat their tape. But in a tape according to the invention, these characteristics are attained without the need for a second coating.

DESCRIPTION OF THE INVENTION

We shall now describe the ingredients and the optimum procedures involved in making an improved magnetic tape in accordance with the invention.

Use is made of a water-soluble resin having a high molecular weight. For this purpose, polymers of ethylene oxide were selected, the molecular weight of which ranges from 150,000 to 250,000. This resin is a polyether having a tremendous hydrogen bond with water. When dried, this material is micro-crystalline in nature, with a particle size close to one micron. The resin is further characterized by the fact that when dried, it is velvet-smooth and has lubricating properties, thereby dispensing with the need for a lubricating agent.

Thus roughness in the tape is avoided, and the side effects of abrasion, e.g. noise and head wear, are obviated. Another important characteristic of the water-soluble polyethylene oxide resin is its easy association with various polar components.

Mixed with the polyethylene resin is an ammoniacal solution of a styrene maleic anhydride copolymer, which functions both as a dispersant for the iron oxide pigment and as a binder intermediate. This material has unusual characteristics, for when combined with water-soluble glycols, it will on heating, convert to three-dimensional insoluble thermosetting resins. The presence of this combined copolymer assures an excellent dispersion of the pigment and a strong association with the other constituents of the dispersion.

A wetting agent is also included in the dispersion. The majority of standard wetting agents have a characteristic re-wettability, which is a serious drawback in the context of magnetic tape. We have found, however, that alkyl phenoxy polyethoxy ethanol not only effectively wets the compound in the mixing stage, but that in combination with the polyethylene oxide, it reduces substantially the drag and inertia presented by the entire water-based solution. Moreover in the dried state, this wetting agent strongly resists being redissolved with water.

In order to bind all of the constituents of the dispersion together and to act as an adhesive that will stick to the substrate, use is made of an acrylic latex. Latexes have high water solubility with true thermoplasticity as well as excellent flexibility and an ability to mix well with the other constituents involved.

The preparation of the dispersion using the above-noted ingredients was carried out in a procedure wherein each constituent is kept in liquid form to facilitate the addition of the other constituents.

The following formula was found to provide highly satisfactory results:

| | Grams |
|---|---|
| Binder—acrylic latex | —300 |
| Resins: | |
| Polyethylene oxide solution | —50 |
| Ammoniacal solution of copolymer of styrene maleic anhydride | —60 |
| Water soluble propylene glycol | —10 |
| Solvent—distilled water | —150 |
| Wetting agent—alkyl phenoxy polyethoxy ethanol | —5 |
| Magnetic material—iron oxide pigment | —300 |

The ingredients were added to and mixed in a jacketed tank having water circulating at a temperature of 90° F. Mixing in the tank is effected by propellers whose shaft is driven by a variable speed motor. The following is the preferred procedure for preparing the dispersion:

Step I

Rotating at about 500 r.p.m., the acrylic latex is put in the tank as soon as the temperature of the water therein is at about 80° F. We then slowly start to pour in the polyethylene oxide and increase the speed to 1000 r.p.m. This speed of agitation is maintained for more than 15 minutes.

Step II

We then start to introduce the copolymer of styrene maleic anhydride, and while running at 1000 r.p.m., propylene glycol is added. Continuing mixing, polyethylene oxide is added in hydrolyzed form. At this point, the wetting agent, already dissolved in warm water, is added.

Step III

The heat is then taken off, and mixing at 1000 r.p.m. continues for one hour. We then proceed to slowly add the pigment while at the same time, as the solution thickens, increase the mixing speed to compensate for the increased thickness. After four hours of continuous mixing, the preparation is ready for ball-milling.

Step IV

Ball-milling is carried out for about 10 to 12 hours, after which the dispersion is in condition for painting on tape.

When the dispersion produced in the above-described manner was coated on a plastic tape and dried by hot air treatment to drive off the water, the coating was found to be of excellent quality and the resultant magnetic tape was found to be highly flexible and very smooth.

In the above formulation, the iron oxide pigment may be replaced by barium ferrite particles in order to make flexible magnets or by graphite to make electric panel heaters. For outdoor painting purposes, one may use a colored pigment in a dispersion as above described, and apply it to metal or plastic sheeting or to tiles to produce a building cover which is highly weather-resistant.

While there has been shown and described a preferred embodiment of a water-based binder for magnetic tape in accordance with the invention, it will be appreciated that many changes and modifications may be made therein without, however, departing from the essential spirit of the invention.

I claim:

1. The method of producing a magnetic tape, said method comprising intermixing with water, an acrylic latex, a polyethylene oxide solution and an ammoniacal solution of copolymer of styrene maleic anhydride and magnetic particles, adding a wetting agent to the mixture, ball-milling the mixture for a period sufficient to effect a uniform suspension of said particles in the mixture, coating said mixture on a plastic tape, and drying said coating to drive off the water to produce a magnetic tape.

2. The method set forth in claim 1, wherein said wetting agent is alkyl phenoxy polyethoxy.

References Cited

UNITED STATES PATENTS

| | | | |
|---|---|---|---|
| 3,023,123 | 2/1962 | Colwill et al. | 117—235 |
| 3,592,687 | 7/1971 | Schnell et al. | 252—62.54 |
| 3,595,694 | 7/1971 | Akai et al. | 252—62.54 |
| 3,597,273 | 8/1971 | Akashi et al. | 252—62.54 |
| 3,200,007 | 8/1965 | Flowers | 252—62.54 |
| 3,240,621 | 3/1966 | Flower et al. | 252—62.54 |

FOREIGN PATENTS

| | | | |
|---|---|---|---|
| 703,248 | 2/1965 | Canada | 117—235 |

OTHER REFERENCES

Denk et al.: IBM Technical Disclosure Bulletin, vol. 13, No. 12, May 1971.

DANIEL E. WYMAN, Primary Examiner

A. P. DEMERS, Assistant Examiner

U.S. Cl. X.R.

117—230, 236; 252—62.54